United States Patent
Wuidart et al.

(10) Patent No.: US 7,049,935 B1
(45) Date of Patent: May 23, 2006

(54) SIZING OF AN ELECTROMAGNETIC TRANSPONDER SYSTEM FOR A DEDICATED DISTANT COUPLING OPERATION

(75) Inventors: Luc Wuidart, Pourrieres (FR); Jean-Pierre Enguent, Saint Savournin (FR)

(73) Assignee: STMicroelectronics S.A., Gentilly (FR)

( * ) Notice: Subject to any disclaimer, the term of this patent is extended or adjusted under 35 U.S.C. 154(b) by 695 days.

(21) Appl. No.: 09/615,273

(22) Filed: Jul. 13, 2000

(51) Int. Cl.
H04Q 5/22 (2006.01)

(52) U.S. Cl. .................. 340/10.4; 331/65; 340/825.72

(58) Field of Classification Search ............ 340/10.4; 331/65
See application file for complete search history.

(56) References Cited

U.S. PATENT DOCUMENTS

| | | | |
|---|---|---|---|
| 2,411,555 A | 11/1946 | Rogers | |
| 3,618,089 A | 11/1971 | Moran, Jr. et al. | |
| 4,068,232 A | 1/1978 | Meyers et al. | |
| 4,209,783 A | 6/1980 | Ohyama et al. | |
| 5,258,348 A | 3/1981 | Belfer et al. | |

(Continued)

FOREIGN PATENT DOCUMENTS

| | | |
|---|---|---|
| DE | 28 35 549 A1 | 3/1979 |
| DE | 44 44 984 | 12/1994 |
| DE | 195 46 928 | 6/1997 |
| DE | 196 21 076 | 11/1997 |
| DE | 196 32 282 A1 | 2/1998 |
| EP | 0 038 877 | 11/1981 |
| EP | 0 369 622 | 5/1990 |
| EP | 0 568 067 A | 11/1993 |
| EP | 0 579 332 A1 | 1/1994 |
| EP | 0 645 840 A | 3/1995 |
| EP | 0 768 540 | 4/1997 |
| EP | 0 857 981 A1 | 8/1998 |
| EP | 0 902 475 A | 3/1999 |
| FR | 2 114 026 | 6/1972 |
| FR | 2 746 200 | 9/1997 |
| FR | 2 757 952 | 7/1998 |
| GB | 2 298 553 A | 9/1996 |
| GB | 2 321 726 A1 | 8/1998 |
| JP | 407245946 A | 9/1995 |
| JP | 10-145267 | 5/1998 |
| JP | 10-203066 | 8/1998 |
| JP | P2001-86044 A * | 3/2001 |
| WO | WO 93/17482 | 9/1993 |
| WO | WO 98/20363 | 5/1998 |
| WO | WO 99/33017 | 7/1999 |
| WO | WO 99/43096 | 8/1999 |

OTHER PUBLICATIONS

French Search Report from French Patent Application No. 99 09563, filed Jul. 20, 1999.
French Search Report from French Patent Application No. 98 08025, filed Jun. 22, 1998.
French Search Report from French Patent Application No. 99 04547, filed Apr. 7, 1999.

(Continued)

Primary Examiner—Michael Horabik
Assistant Examiner—M. Shimizu
(74) Attorney, Agent, or Firm—Lisa K. Jorgenson; James H. Morris; Wolf, Greenfield & Sacks, P.C.

(57) ABSTRACT

A system of contactless electromagnetic transmission between a terminal including a series oscillating circuit for generating an electromagnetic field and a transponder including a parallel oscillating circuit, these oscillating circuits being sized so that the coupling coefficient between them rapidly decreases when the distance separating the transponder from the terminal becomes smaller than a predetermined value.

24 Claims, 1 Drawing Sheet

U.S. PATENT DOCUMENTS

| | | |
|---|---|---|
| 4,278,977 A | 7/1981 | Nossen |
| 4,375,289 A | 3/1983 | Schmall et al. |
| 4,408,185 A | 10/1983 | Rasmussen |
| 4,593,412 A | 6/1986 | Jacob |
| 4,656,472 A | 4/1987 | Walton |
| 4,660,192 A | 4/1987 | Pomatto, Sr. |
| 4,673,932 A | 6/1987 | Ekchian et al. |
| 4,706,050 A | 11/1987 | Andrews |
| 4,782,308 A | 11/1988 | Trobec et al. .................. 331/65 |
| 4,802,080 A | 1/1989 | Bossi et al. |
| 4,814,595 A | 3/1989 | Gilboa |
| 4,827,266 A | 5/1989 | Sato et al. |
| 4,928,108 A | 5/1990 | Kropielnicki et al. |
| 4,963,887 A | 10/1990 | Kawashima et al. |
| 5,013,898 A | 5/1991 | Glasspool .................... 235/449 |
| 5,055,853 A | 10/1991 | Garnier |
| 5,084,699 A | 1/1992 | DeMichele |
| 5,099,227 A | 3/1992 | Geiszler et al. |
| 5,126,749 A | 6/1992 | Kaltner |
| 5,142,292 A | 8/1992 | Chang |
| 5,202,644 A | 4/1993 | Brady |
| 5,214,409 A | 5/1993 | Beigel |
| 5,235,326 A | 8/1993 | Beigel et al. |
| 5,305,008 A | 4/1994 | Turner et al. |
| 5,324,315 A | 6/1994 | Grevious |
| 5,452,344 A | 9/1995 | Larson |
| 5,541,958 A | 9/1995 | Schuermann |
| 5,493,267 A | 2/1996 | Ahlse et al. |
| 5,504,485 A | 4/1996 | Landt et al. |
| 5,519,381 A | 5/1996 | Marsh et al. |
| 5,521,602 A | 5/1996 | Carroll et al. |
| 5,541,604 A | 7/1996 | Meier |
| 5,550,536 A | 8/1996 | Flaxl |
| 5,604,411 A | 2/1997 | Venkitasubrahmanian et al. |
| 5,619,529 A | 4/1997 | Fujioka |
| 5,621,411 A | 4/1997 | Hagl et al. |
| 5,691,605 A | 11/1997 | Xia et al. |
| 5,698,837 A | 12/1997 | Furuta |
| 5,698,838 A | 12/1997 | Yamaguchi |
| 5,701,121 A | 12/1997 | Murdoch |
| 5,703,573 A | 12/1997 | Fujimoto et al. |
| 5,767,503 A | 6/1998 | Gloton ....................... 238/487 |
| 5,801,372 A | 9/1998 | Yamaguchi |
| 5,831,257 A | 11/1998 | Yamaguchi |
| 5,850,416 A | 12/1998 | Myer |
| 5,874,725 A | 2/1999 | Yamaguchi |
| 5,883,582 A | 3/1999 | Bowers et al. |
| 5,889,273 A | 3/1999 | Goto |
| 5,905,444 A | 5/1999 | Zimmer |
| 5,955,950 A | 9/1999 | Gallagher, III et al. |
| 6,014,088 A | 1/2000 | Van Santbrink et al. |
| 6,025,780 A | 2/2000 | Bowers et al. |
| 6,028,503 A | 2/2000 | Preishuberpflugl et al. |
| 6,034,640 A | 3/2000 | Oida et al. |
| 6,070,803 A | 6/2000 | Stobbe |
| 6,070,804 A | 6/2000 | Miyamoto |
| 6,072,383 A | 6/2000 | Gallagher, III et al. |
| 6,075,491 A | 6/2000 | Dakeya et al. |
| 6,100,788 A | 8/2000 | Frary |
| 6,137,411 A | 10/2000 | Tyren |
| 6,150,986 A | 11/2000 | Sandberg et al. |
| 6,154,635 A | 11/2000 | Ohta |
| 6,172,608 B1 | 1/2001 | Cole |
| 6,208,235 B1 | 3/2001 | Trontelj |
| 6,229,443 B1 | 5/2001 | Roesner |
| 6,243,013 B1 | 6/2001 | Duan et al. |
| 6,265,962 B1 | 7/2001 | Black et al. |
| 6,272,320 B1 | 8/2001 | Nandra et al. |
| 6,272,321 B1 | 8/2001 | Bruhnke et al. |
| 6,281,794 B1 | 8/2001 | Duan et al. |
| 6,304,169 B1 | 10/2001 | Blama et al. |
| 6,307,468 B1 | 10/2001 | Ward, Jr. |
| 6,307,517 B1 | 10/2001 | Lee |
| 6,335,665 B1 | 1/2002 | Mendelsohn |
| 6,356,738 B1 | 3/2002 | Schneider et al. |
| 6,393,045 B1 | 5/2002 | Belcher et al. |
| 6,424,820 B1 | 7/2002 | Burdick et al. |
| 6,441,804 B1 | 8/2002 | Hsien |
| 6,446,049 B1 * | 9/2002 | Janning et al. ................ 704/40 |
| 6,491,230 B1 | 12/2002 | Dubost et al. |
| 6,498,923 B1 | 12/2002 | Ikefuji et al. |
| 6,617,962 B1 | 9/2003 | Horwitz et al. |
| 6,646,543 B1 | 11/2003 | Mardinian et al. |
| 6,650,226 B1 | 11/2003 | Wuidart et al. |
| 6,650,227 B1 | 11/2003 | Bradin |
| 6,650,229 B1 | 11/2003 | Wuidart et al. |
| 6,654,466 B1 | 11/2003 | Ikefuji et al. |
| 6,690,229 B1 | 2/2004 | Rudolph |
| 6,703,921 B1 | 3/2004 | Wuidart et al. |
| 2002/0008611 A1 | 1/2002 | Wuidart |
| 2003/0227323 A1 | 12/2003 | Enguent |

OTHER PUBLICATIONS

French Search Report from French Patent Application No. 99 04546, filed Apr. 7, 1999.

French Search Report from French Patent Application No. 98 08024, filed Jun. 22, 1998.

French Search Report from French Patent Application No. 99 04548, filed Apr. 7, 1999.

French Search Report from French Patent Application No. 99 04544, filed Apr. 7, 1999.

French Search Report from French Patent Application No. 00/01214, filed Jan. 31, 2000.

French Search Report from French Patent Application No. 00/06301, filed May 17, 2000.

French Search Report from French Patent Application No. 99 04548, filed Apr. 7, 1999.

French Search Report from French Patent Application No. 99 04545, filed Apr. 7, 1999.

French Search Report from French Patent Application No. 99 07024, filed May 31, 1999.

French Search Report from French Patent Application No. 00 06302, filed May 17, 2000.

French Search Report from French Patent Application No. 00 06065, filed May 12, 2000.

French Search Report from French Patent Application No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

* cited by examiner

SIZING OF AN ELECTROMAGNETIC TRANSPONDER SYSTEM FOR A DEDICATED DISTANT COUPLING OPERATION

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read and/or write terminal. The present invention more specifically relates to transponders having no independent power supply. Such transponders extract the power supply required by the electronic circuits included therein from the high frequency field radiated by an antenna of the read/write terminal. The present invention applies to such transponders, be they read only transponders, that is, adapted to operate with a terminal only reading the transponder data, or read/write transponders, which contain data that can be modified by the terminal.

2. Discussion of the Related Art

Systems using electromagnetic transponders are based on the use of oscillating circuits including a winding forming an antenna, on the transponder side and also on the read/write terminal side. These circuits are intended to be coupled by a close magnetic field when the transponder enters the field of the read/write terminal.

FIG. 1 very schematically shows, in a simplified way, a conventional example of a data exchange system between a read/write terminal 1 and a transponder 10.

Generally, terminal 1 is essentially formed of an oscillating circuit formed of an inductance L1 in series with a capacitor C1 and a resistor R1, between an output terminal 2 of an amplifier or antenna coupler (not shown) and a reference terminal 3 (generally, the ground). The antenna coupler belongs to a circuit 4 for controlling the oscillating circuit and exploiting received data including, among others, a modulator-demodulator and a microprocessor for processing the control signals and the data. In the example shown in FIG. 1, node 5 of connection of capacitor C1 with inductance L1 forms a terminal for sampling a data signal received from transponder 10 for the demodulator. Circuit 4 of the terminal generally communicates with different input/output circuits (keyboard, screen, means of transmission to a provider, etc.) and/or processing circuits, not shown. The circuits of the read/write terminal draw the power required by their operation from a supply circuit (not shown) connected, for example, to the electric supply system.

A transponder 10, intended for cooperating with a terminal 1, essentially includes an inductance L2, in parallel with a capacitor C2 between two input terminals 11, 12 of a circuit 13 of control and processing of transponder 10. Terminals 11, 12 are, in practice, connected to the input of a rectifying means (not shown), the outputs of which define D.C. supply terminals of the circuits internal to the transponder. In FIG. 1, the load formed of the circuits of transponder 10 on the oscillating circuit have been modeled by a resistor R2, shown in dotted lines, in parallel with inductance L2 and capacitor C2.

The oscillating circuit of terminal 1 is excited by a high-frequency signal (for example, 13.56 MHz) intended for being sensed by a transponder 10. When transponder 10 is in the field of terminal 1, a high-frequency voltage is generated across terminals 11, 12 of the transponder's resonant circuit. This voltage, after being rectified, is intended for providing the supply voltage of electronic circuits 13 of the transponder. These circuits generally essentially include a microprocessor, a memory, a demodulator of the signals possibly received from terminal 1, and a modulator for transmitting information to the terminal.

The data transmission from transponder 10 to terminal 1 is generally performed by modifying the load of oscillating circuit L2, C2, so that the transponder draws a lesser or greater amount of power from the high-frequency magnetic field. This variation is detected, on the side of terminal 1, because the amplitude of the high-frequency excitation signal is maintained constant. Accordingly, a power variation of the transponder translates as a variation of the current amplitude and phase in antenna L1. This variation is then detected, for example, by a measuring the signal of terminal 5, either by means of a phase demodulator, or by means of an amplitude demodulator. The load variation on the transponder side is generally performed by means of an electronic switch for controlling a resistor or a capacitor modifying the load of the oscillating circuit. The electronic switch is generally controlled at a so-called sub-carrier frequency (for example, 847.5 kHz), much smaller (generally with a ratio of at least 10) than the frequency of the excitation signal of the oscillating circuit of terminal 1.

In the case of a phase demodulation by terminal 1, its modulator detects, in the sub-carrier half-periods when the electronic switch of the transponder is closed, a slight phase shift (by a few degrees, or even less than one degree) of the high-frequency carrier with respect to a reference signal. The demodulator output then provides a signal that is an image of the control signal of the electronic switch of the transponder, which can be decoded to restore the transmitted binary data.

To obtain a proper operation of the system, the oscillating circuits of terminal 1 and of transponder 10 are generally tuned on the carrier frequency, that is, their resonance frequency is set, for example, to the 13.56-MHz frequency. This tuning aims at maximizing the power transfer to the transponder, generally, a card of credit card size integrating the different transponder components.

The fields of application of electromagnetic transponders (for example, the crossing of highway tolls, the counting or the authentication of transponder carriers, etc.) may make it desirable to guarantee that a transponder only operates in a predetermined distance relation with a read/write terminal, more specifically in a distant relation, generally defined by a distance greater than 5 cm separating the respective antennas of the transponder and of the read/write terminal.

For example, in applications such as the crossing of highway tolls where the driver is necessarily far from the terminal, it is indispensable to guarantee the transaction security and prevent the pay or authentication signal from being intercepted by a "pirate" terminal placed closer to the transponder. In this case, it must be guaranteed that the transponder will only operate in a distant relation with the terminal.

Still as an example, when a transponder is in the terminal field, another transponder can also be in this field. Conventional systems then favor the operation of the transponder that is closest to the terminal. In some applications, it may however be desired to favor the operation of the most distant transponder. In this case, conventional systems provide no acceptable solution.

Indeed, a transponder that would then be closer to the terminal could capture the information transmitted by the terminal to the distant transponder, which does not provide the desired guarantees in terms of security. Further, a pirate terminal can then be interposed between the authorized terminal and the transponder and then intercept the transponder's information, which is not desirable either.

Another problem that is raised is that, in conventional systems, a transponder in a relatively distant coupling relation with a terminal will receive less power than a transponder placed closer to the terminal. In such a case, the system operation risks suffering therefrom.

SUMMARY OF THE INVENTION

The present invention aims at providing a solution to the need for operation in a relatively distant range of electromagnetic transponder systems.

The present invention aims, in particular, at providing a solution that enables structurally dedicating a transponder and/or a terminal to an operation in a relatively distant range.

More generally, the present invention aims at providing a solution that enables structurally dedicating a transponder and/or a terminal to an operation in a relation where the antennas are at a distance greater than a predetermined value from each other.

The present invention also aims at providing a solution that is particularly simple to implement for the manufacturer and that is reliable in time.

To achieve these and other objects, the present invention provides an electromagnetic transponder of the type including a parallel oscillating circuit adapted to being excited by a series oscillating circuit of a read/write terminal when the transponder enters the field of the terminal, the components of the oscillating circuit of the transponder being sized so that the coupling coefficient between the respective oscillating circuits of the terminal and of the transponder rapidly decreases when the distance separating the transponder from the terminal becomes smaller than a predetermined value.

According to an embodiment of the present invention, said value is 5 cm.

According to an embodiment of the present invention, an inductance of the parallel oscillating circuit is reduced or minimized.

According to an embodiment of the present invention, inductance L2 of the parallel oscillating circuit is chosen so that the following relation is respected:

$$kopt = \sqrt{\frac{R1L2}{R2L1}},$$

where kopt represents the coupling coefficient providing a maximum voltage across the parallel oscillating circuit, where R1 represents the series resistance of the series oscillating circuit, where R2 represents the equivalent resistance of the transponder brought in parallel on inductance L2, and where L1 represents the inductance of the series oscillating circuit.

According to an embodiment of the present invention, the components of the oscillating circuit of the transponder are sized based on an operating point at a median distance of a desired operating range, chosen to correspond to a coupling coefficient as close as possible to an optimal coupling coefficient respecting the following relation:

$$V2\max(kopt) = \sqrt{\frac{R2}{R1}} \frac{Vg}{2},$$

where V2max represents the voltage across the parallel oscillating circuit for the optimal coupling between the oscillating circuits, where R1 represents the series resistance of the series oscillating circuit, where R2 represents the equivalent resistance of the transponder brought in parallel on its oscillating circuit, and where Vg represents the excitation voltage of the series oscillating circuit.

According to an embodiment of the present invention, the number of turns of the inductance of the oscillating circuit of the transponder is smaller than 3.

According to an embodiment of the present invention, the respective values of the capacitance and of the inductance of the parallel oscillating circuit range between 20 and 500 pf and between 0.1 and 10 µH.

The present invention also provides a terminal for generating an electromagnetic field adapted to cooperating with at least one transponder when said transponder enters this field, including a series oscillating circuit for generating the electromagnetic field, this series oscillating circuit being sized so that the coupling coefficient between the respective oscillating circuits of the terminal and of the transponder strongly decreases when the distance separating the transponder from the terminal becomes smaller than a predetermined value.

According to an embodiment of the present invention, the components of the oscillating circuit of the terminal are sized to fulfill the operating conditions of the transponder.

According to an embodiment of the present invention, the inductance of the terminal's series oscillating circuit includes between 3 and 15 turns.

The present invention further relates to a system of contactless electromagnetic transmission between a terminal and a transponder.

The foregoing objects, features and advantages of the present invention, will be discussed in detail in the following non-limiting description of specific embodiments in connection with the accompanying drawings.

DETAILED DESCRIPTION

Figure 1:
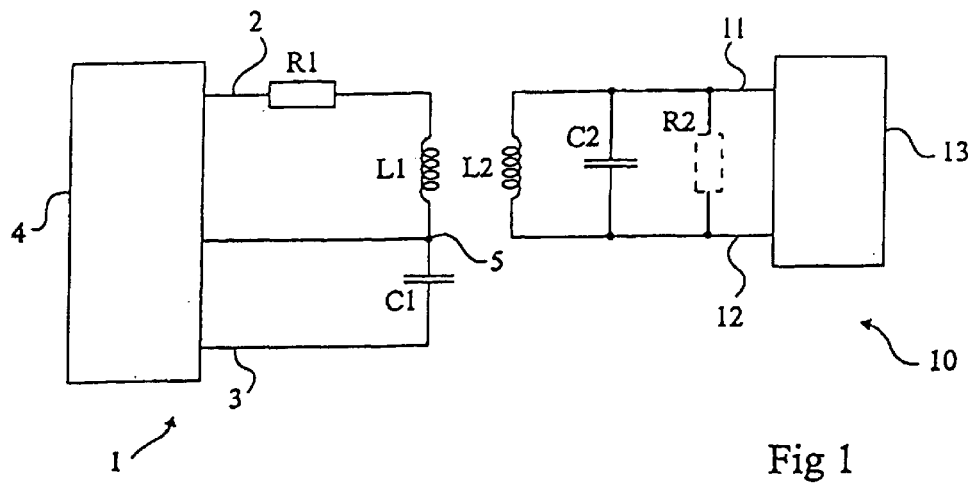
FIG. 1, previously described, very schematically shows a read/write terminal and an electromagnetic transponder of the type to which the present invention applies.

For clarity, only those elements necessary to the understanding of the present invention have been shown in the drawings and will be described hereafter. In particular, the circuits for controlling and exploiting the oscillating circuits of the transponder and of the terminal have not been detailed.

A feature of the present invention is to provide a specific sizing of the oscillating circuit of an electromagnetic transponder so that said transponder is structurally dedicated to an operation in a relatively distant range, that is, at more than 5 cm from a read/write terminal and, preferably, between 5 cm and the system range limit. This range depends on the transponder power consumption and is, for example, on the order of 20 to 30 cm for low-consumption transponders of tag type and on the order of 10 to 20 cm for transponders equipped with microcontrollers.

The notion of distance to which the present invention refers is the distance separating respective antennas L1, L2 (FIG. 1) of a transponder 10 and of a terminal 1.

The present invention thus provides placing, preferably by respective sizings of the oscillating circuits of the transponder and of the antenna, the operating point of the system to guarantee the desired range operation at the tuning frequency, that is, when the resonance frequencies of the oscillating circuit substantially correspond to the frequency of the remote supply carrier (for example, 13.56 MHz).

Figure 2:
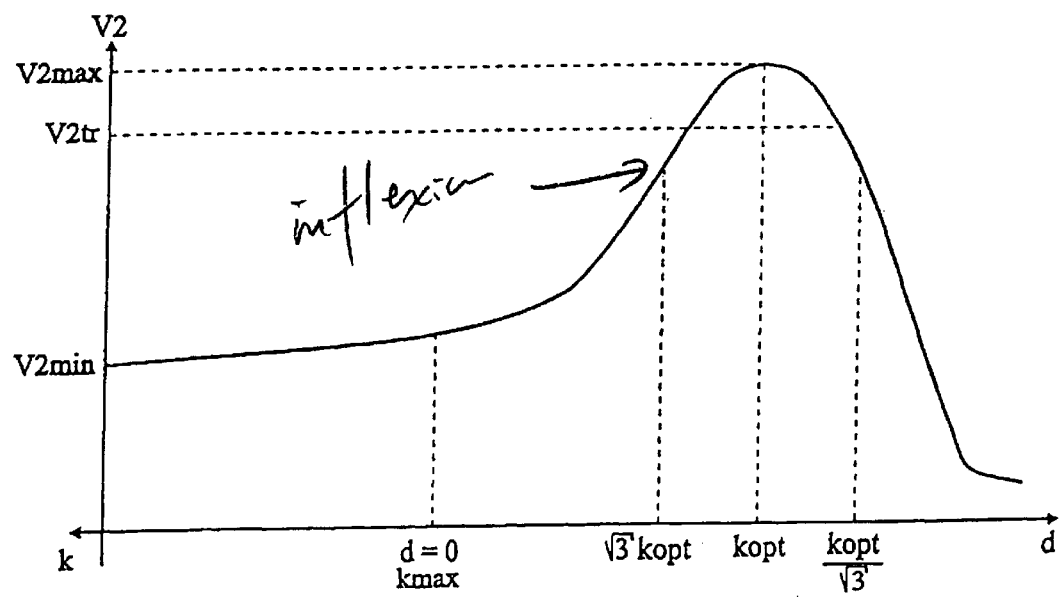
FIG. 2 shows an example of variation of the voltage across the oscillating circuit of a transponder according to the distance separating it from a terminal.

FIG. 2 shows the variation of voltage V2 across terminals 11, 12 of the transponder according to distance d separating the transponder from a read/write terminal.

The curve of FIG. 2 can also be considered as showing the variation of voltage V2 according to coupling coefficient k between the oscillating circuits of the transponder and of the terminal. Indeed, the coupling between the oscillating circuits is a function of the distance separating the antennas. More specifically, coupling coefficient k is, as a first approximation, proportional to 1-d. Accordingly, in the following description, reference will be made either to distance or to the coupling coefficient as the abscissa of the characteristic of FIG. 2. The x-axis represents a distance d increasing towards the right of the drawing and a coupling coefficient k increasing towards the left of the drawing.

Voltage V2 exhibits a maximum V2max for an optimal value of coupling coefficient kopt. This value corresponds to the smallest coupling value between the two antennas for which voltage V2 is maximum when the frequency corresponds to the resonance frequency of the oscillating circuits. This value corresponds, according to the present invention, to a relatively large distance. For a given frequency and sizing determining the operating conditions, voltage V2 decreases on either side of the optimal coupling position.

The curve exhibits a point of inflexion for a coupling value of kopt √3, that is, for a distance smaller than the optimal coupling position. On the smaller distance side, the curve tends towards an asymptote at a minimum voltage position V2min. On the greater distance side at the optimal coupling position, the decrease of voltage V2 is stronger.

Further, the voltage level of the point of inflexion at kopt √3 reappears, symmetrically with respect to the optimal coupling position, for a value kopt÷√3.

A feature of the present invention is to determine, by means of the respective values of the oscillating circuit components, a distance operating point such that moving away (by increasing the distance) from this operating point strongly decreases the coupling between the oscillating circuits.

According to the present invention, the zero distance point will be chosen to correspond, while being as far as possible from the optimal coupling point, to a coupling coefficient greater than the optimal coefficient and adapted to the minimum voltage V2tr required for a proper transponder operation. This amounts to placing a zero-distance operating point to the left of the optimal coupling position on FIG. 2. This point corresponds to a real maximum coupling kmax. Coefficient kmax depends on the respective geometries of antennas L1 and L2 and is, of course, included between 0 and 1. In practice, it should be noted that the real maximum coupling coefficient kmax between two oscillating circuits generally does not exceed 0.7.

Preferably, the operating range is positioned on the characteristic of FIG. 2 so that, when distance d decreases, the coupling coefficient strongly increases. The best solution is that the optimal coupling point approximately corresponds to the center of the desired distance operating range. Thus, the most regular possible remote supply power is obtained, since the operating range includes the "bulge" of the characteristic. Another advantage then is that the distance decrease is located in a portion having a steep slope. Thus, as soon as the distance deviates (by moving away from the terminal) from the operating range, the coupling coefficient rapidly decreases so that the transponder is then no longer supplied. Preferably, the real maximum operating point will be chosen so that the corresponding voltage V2 is far from position kopt and corresponds to a smaller distance, and so that minimum operating voltage V2tr of the transponder is included between the voltage corresponding to the point of inflexion and voltage V2max.

Preferably, the smallest possible value of inductance L2 of transponder 10, while remaining compatible with an integration of capacitor C2 for the desired resonance frequency (for example, 13.56 MHz), is chosen.

It should be noted that, while in conventional systems the value of inductance L2 of the transponder is desired to be decreased to decrease the system range, the present invention conversely provides decreasing this inductance for a dedicated operation in distant coupling.

Searching the smallest possible inductance L2 is compatible with searching the smallest possible remote supply voltage for the zero distance. Similarly, it will be desired to maximize the value of equivalent resistance R2, still for decreasing the distant coupling coefficient so that the optimal coupling is at the farthest possible distance (which amounts to saying that a small value is desired). An advantage of an increase of resistance R2 is that this decreases the consumption. The transponder's remote supply need and the dissipation therein will however be taken into account.

It should be noted that the search for the smallest possible inductance L2 corresponds to a decrease of the number of turns of this inductance (for example, of the number of conductive turns in antenna L2 formed on the chip card forming the transponder). This decrease of the number of turns decreases the parasitic resistance of inductance L2. However, the decrease of the parasitic series resistance corresponds, brought in parallel on the oscillating circuit, to an increase of resistance R2. This is thus favorable to increasing resistance R2.

An advantage of increasing the value of capacitor C2 to maintain the resonance frequency despite the small inductance L2 is that this increases the quality factor of the transponder. Indeed, the quality factor of a parallel resonant circuit is equal to ωR2C2, where ω represents the pulse of the oscillating circuit. Now, the greater the quality factor, the larger the range.

According to a preferred embodiment of the present invention, the respective values of the different components are determined as follows.

First, the application and the energetic needs of the transponder determine the voltage V2tr to be obtained by remote supply. For a given excitation voltage Vg of the oscillating circuit of the terminal, the voltage V2 recovered by the transponder is a function of the respective values of series resistance R1 of the terminal and of equivalent resistance R2 of the transponder in parallel on its oscillating circuit. The value of resistance R2 can be evaluated based on the transponder components (microprocessor, regulator, etc.) that determine the remote supply need to be maintained.

At theoretical optimal coupling point kopt, voltage V2max is provided by the following relation:

$$V2\text{max}(kopt) = \sqrt{\frac{R2}{R1}} \frac{Vg}{2}.$$

More generally, the relation linking voltage V2 to coupling coefficient k can be written as:

$$V2(k) = \frac{kR2Vg\sqrt{\frac{L1}{L2}}}{R1 + k^2\frac{L1}{L2}R2}.$$

After determining the voltage V2 to be obtained across capacitor C2, inductance L2 is sized to the smallest possible value.

Then, capacitance C2 of the oscillating circuit is determined according to the desired resonance frequency, based on relation:

$$C2 = \frac{1}{L2\omega^2}.$$

The values may be adapted to maintain the integration of capacitor C2.

Knowing inductance L2, the value to be given to the inductance of antenna L1 of the terminal to optimize the system can be determined. The relation linking these two values for the curve of FIG. 2 to be respected is, at the tuning, that is, for a sizing setting the resonance frequency to the frequency of the remote supply carrier:

$$L1 = \frac{R1L2}{R2k^2}.$$

Preferably, the value of inductance L1 is chosen to be as high as possible, that is, by maximizing its number of turns. Thus, according to the present invention, the number of turns of the terminal is relatively high, preferably between 3 and 15, and the number of turns of the transponder is relatively small, preferably smaller than 3. This choice is motivated by the fact that, to maximize resistance R2, the series parasitic resistance of inductance L2 must be as small as possible, and a small number of turns with conductors of relatively wide section is thus preferred. This choice must be compatible with the integration of capacitor C2. It should be noted that, on the terminal side, the number of turns of the terminal must remain compatible with a value of capacitance C1 that is sufficient to be realizable.

Preferably, the terminal will be provided with as small a resistance R1 as possible to obtain an optimal coupling at the greatest possible distance.

As a specific example of embodiment, for a 13.56-MHz carrier frequency and for a value of 370 nanohenrys for inductance L2, a capacitor C2 having a capacitance of 372 picofarads will be used. If the transponder's microprocessor requires a minimum voltage on the order of 4 volts to operate, a voltage V2 of approximately 5 volts will be chosen for a median distance position of the operating range. The preferred ranges of values are, for example, an inductance L2 of given value included between 0.1 and 10 µH and capacitance C2 of given value included between 20 and 500 pf.

In an application to a low-consumption transponder of tag type, the number of turns is, preferably, equal to 1. In an application to a transponder of chip card type (equipped with a microcontroller) of greater consumption, the number of turns is preferably equal to 2.

It should be noted that the fact of structurally determining the respective values of the components of the oscillating circuits of the terminal and the transponder is not disturbing. Indeed, in most applications, a given transponder type is dedicated to a terminal. In particular, the operating characteristics of electromagnetic transponder systems are generally submitted to standards. Accordingly, it is not disturbing to definitively determine the relations between the oscillating circuits of a terminal and of a transponder. Conversely, this is an advantage of the present invention since risks of unauthorized intervention on the transponder for piracy are thus avoided.

Preferably, the back modulation by the transponder will be capacitively performed, that is, by means of an electronic switch modifying the capacitance of the oscillating circuit rather than the resistance. An advantage then is that the remote supply is less attenuated.

An advantage of the present invention is that it enables forming transponders and systems dedicated to an operation in distant range.

Another advantage of the present invention is that it fulfils the strictest requirements to avoid piracy of a transponder.

Of course, the present invention is likely to have various alterations, modifications, and improvements which will readily occur to those skilled in the art. In particular, the choice of the values of the components of the oscillating circuits is within the abilities of those skilled in the art based on the function indications and on the relations given hereabove, according to the application and, in particular, to the frequency of the carrier on which these oscillating circuits are to be tuned. Further, it should be noted that the present invention does not alter the respective operations of the transponder and of the terminal as concerns the digital processing circuits.

Among the applications of the present invention are readers (for example, access control terminals or porticoes, automatic dispensers, computer terminals, telephone terminals, televisions or satellite decoders, etc.) of contactless chip cards (for example, identification cards for access control, electronic purse cards, cards for storing information about the card holder, consumer fidelity cards, toll television cards, etc.), as well as such chip cards.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electromagnetic transponder including a parallel oscillating circuit adapted to being excited by a series oscillating circuit of a read/write terminal when the electromagnetic transponder enters an electromagnetic field of the read/write terminal, wherein components of the parallel oscillating circuit of the electromagnetic transponder are sized so that a distance at which a voltage across the oscillating circuit of the transponder is maximum is greater than a distance at which a coupling coefficient between the oscillating circuit of the transponder and the oscillating circuit of the terminal is maximum.

2. The electromagnetic transponder of claim 1, wherein the components of the parallel oscillating circuit of the electromagnetic transponder are sized such that the electromagnetic transponder operates at a distance of 5 cm or greater from the read/write terminal.

3. The electromagnetic transponder of claim 1, wherein the parallel oscillating circuit is configured to have a minimal inductance.

4. The electromagnetic transponder of claim 1, wherein an inductance of the parallel oscillating circuit is chosen in accordance with the following relation:

$$kopt = \sqrt{\frac{R1L2}{R2L1}},$$

where kopt represents the coupling coefficient providing a maximum voltage across the parallel oscillating circuit, where R1 represents a series resistance of the series oscillating circuit, where R2 represents an equivalent resistance of the transponder brought in parallel on inductance L2, and where L1 represents an inductance of the series oscillating circuit.

5. The electromagnetic transponder of claim 1, having a parallel oscillating circuit wherein components are sized based on an operating point at a median distance of a desired operating range, chosen to correspond to a coupling coefficient as close as possible to an optimal coupling coefficient in accordance with the following relation:

$$V2\max(kopt) = \sqrt{\frac{R2}{R1}}\frac{Vg}{2},$$

where V2max(kopt) is a voltage across the parallel oscillating circuit for optimal coupling between the oscillating circuits, R1 is a series resistance of the series oscillating circuit, R2 is an equivalent resistance of the transponder brought in parallel on its oscillating circuit, and Vg is an excitation voltage of the series oscillating circuit.

6. The electromagnetic transponder of claim 1, wherein a number of turns of an inductance of the parallel oscillating circuit is smaller than 3.

7. The electromagnetic transponder of claim 1, wherein respective values of a capacitance and of an inductance of the parallel oscillating circuit range is between 20 and 500 pf and between 0.1 and 10 µH.

8. A terminal for generating an electromagnetic field adapted to cooperate with at least one transponder when said at least one transponder enters the electromagnetic field, including a series oscillating circuit for generating the electromagnetic field, the series oscillating circuit being sized so that a distance at which a voltage across an oscillating circuit of the transponder is maximum is greater than a distance at which a coupling coefficient between the oscillating circuit of the transponder and the series oscillating circuit of the terminal is maximum.

9. The terminal of claim 8, wherein components of the series oscillating circuit are sized so that a distance at which a voltage across the oscillating circuit of the transponder is maximum is greater than a distance at which a coupling coefficient between the oscillating circuit of the transponder and the oscillating circuit of the terminal is maximum.

10. The terminal of claim 9, wherein an inductance of the series oscillating circuit includes between 3 and 15 turns.

11. A system of contactless electromagnetic transmission between a terminal and a transponder, wherein the transponder is that of claim 1.

12. A system of contactless electromagnetic transmission between a terminal and a transponder, wherein the terminal is that of claim 8.

13. A system for contactless electromagnetic transmission between a terminal and a transponder, comprising:
the terminal having a first oscillating circuit including a first resistor a first capacitor and a first inductor; and
the transponder having a second oscillating circuit including a second resistor, a second capacitor and a second inductor;
wherein at least one of the terminal and the transponder is structurally dedicated to operation where a distance between the terminal and the transponder exceeds a predetermined distance;
wherein the first resistor, the first capacitor and the first inductor are sized so that a distance at which a voltage across the second oscillating circuit is maximum is greater than a distance at which a coupling coefficient between the first and second oscillating circuits is maximum.

14. The system of claim 13, wherein the second capacitor is an integrated capacitor.

15. The system of claim 14, wherein the second inductance is configured to have a minimal inductance.

16. The system of claim 13, wherein the first inductor includes between 3 and 15 turns.

17. A system for contactless electromagnetic transmission between a terminal and a transponder, comprising:
the terminal having a first oscillating circuit including a first resistor, a first capacitor and a first inductor; and
the transponder having a second oscillating circuit including a second resistor, a second capacitor and a second inductor;
wherein at least one of the terminal and the transponder is structurally dedicated to operation where a distance between the terminal and the transponder exceeds a predetermined distance;
wherein the second resistor, the second capacitor and the second inductor are sized so that a distance at which a voltage across the second oscillating circuit is maximum is greater than a distance at which a coupling coefficient between the first and second oscillating circuits is maximum.

18. The system of claim 17, wherein the second capacitor is an integrated capacitor.

19. The system of claim 18, wherein the second inductance is configured to have a minimal inductance.

20. The system of claim 17, wherein the first inductor includes between 3 and 15 turns.

21. A system for contactless electromagnetic transmission between a terminal and a transponder, comprising:
the terminal having a first oscillating circuit including a first resistor, a first capacitor and a first inductor; and
the transponder having a second oscillating circuit including a second resistor, a second capacitor and a second inductor;
wherein at least one of the terminal and the transponder is structurally dedicated to operation where a distance between the terminal and the transponder exceeds a predetermined distance;
wherein the first resistor, the first capacitor and the first inductor are connected in series with one another, and wherein the second resistor, the second capacitor and the second inductor are connected in parallel with one another.

22. The system of claim 21, wherein the second capacitor is an integrated capacitor.

23. The system of claim 22, wherein the second inductance is configured to have a minimal inductance.

24. The system of claim 21, wherein the first inductor includes between 3 and 15 turns.

* * * * *

UNITED STATES PATENT AND TRADEMARK OFFICE
CERTIFICATE OF CORRECTION

PATENT NO. : 7,049,935 B1  
APPLICATION NO. : 09/615273  
DATED : May 23, 2006  
INVENTOR(S) : Luc Wuidart and Jean Pierre Enguent Page 1 of 1

It is certified that error appears in the above-identified patent and that said Letters Patent is hereby corrected as shown below:

On The Title Page:
   Item (30) should read:
   (30)  Foreign Application Priority Data
   Jul 20, 1999  (FR)            9909564

Signed and Sealed this

Fifth Day of September, 2006

JON W. DUDAS  
*Director of the United States Patent and Trademark Office*